United States Patent [19]

Kaiser, Jr.

[11] 4,237,822
[45] Dec. 9, 1980

[54] ANIMAL MEDICATION BRUSH

[76] Inventor: LeRoy E. Kaiser, Jr., 7833 Springer St., Downey, Calif. 90241

[21] Appl. No.: 1,884

[22] Filed: Jan. 8, 1979

[51] Int. Cl.³ .................. A01K 13/00; A46B 11/00
[52] U.S. Cl. .................................. 119/85; 401/28; 401/181; 401/279; 132/114
[58] Field of Search .......... 119/83, 85, 156, 157; 132/112, 113, 114; 401/28, 179, 181, 187, 265, 279

[56] References Cited

U.S. PATENT DOCUMENTS

| 712,530 | 11/1902 | Herfert | 119/157 X |
|---|---|---|---|
| 1,191,578 | 7/1916 | Englund | 401/28 |
| 1,342,492 | 6/1920 | Zaboy | 401/279 |
| 1,408,520 | 3/1922 | Larsen | 401/28 |
| 1,413,384 | 4/1922 | Beyermann | 401/279 X |
| 1,596,358 | 8/1926 | Jones | 401/279 |
| 1,597,855 | 8/1926 | Zahorsky | 132/112 X |
| 2,127,794 | 8/1938 | Wastman | 401/179 |
| 3,079,628 | 3/1963 | Wright | 401/179 X |

FOREIGN PATENT DOCUMENTS 667947  3/1952  United Kingdom .................... 132/112

Primary Examiner—Gene Mancene
Assistant Examiner—Robert P. Swiatek
Attorney, Agent, or Firm—John T. Matlago

[57] ABSTRACT

A brush is provided comprising a hollow body containing a liquid medication. Detachably mounted on the bottom of the body is a hollow head communicating with a plurality of depending elongated hollow teeth. Enclosed within the hollow body is a pump manually operated by a lever on the side of the brush handle for forcing the liquid medication into the hollow head and out the hollow teeth in a controlled manner.

8 Claims, 7 Drawing Figures

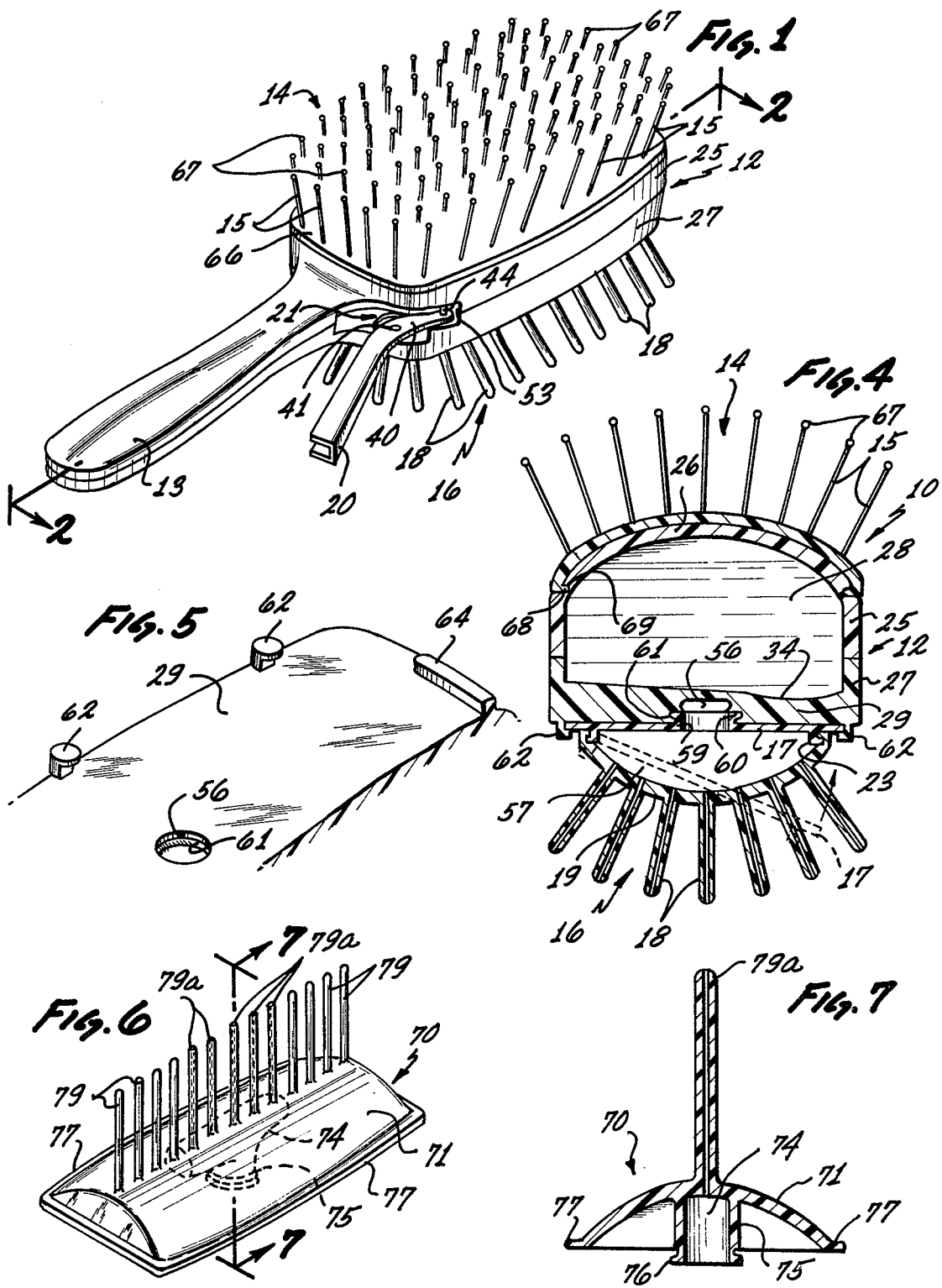

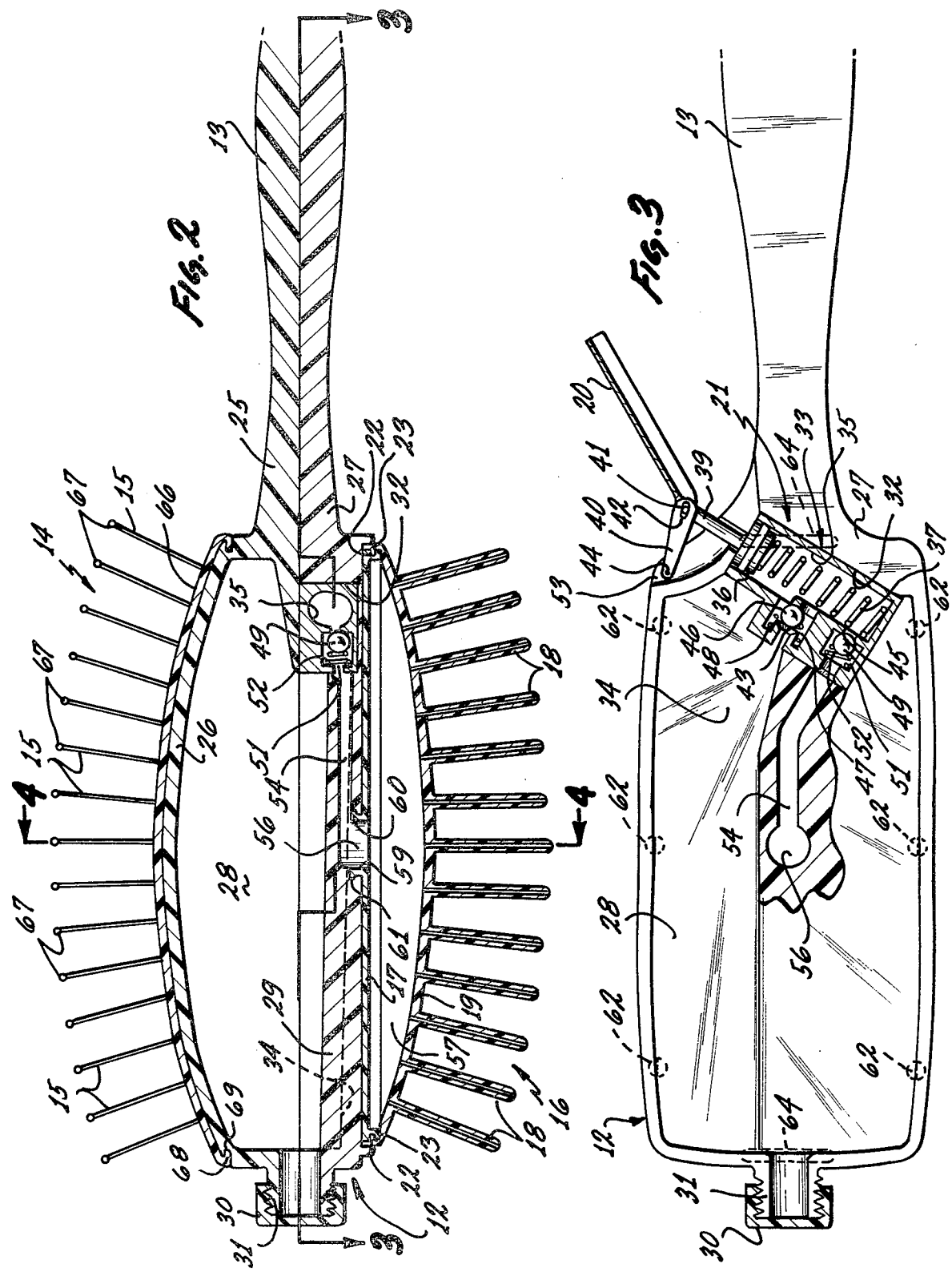

ANIMAL MEDICATION BRUSH

BACKGROUND AND SUMMARY OF THE INVENTION

This invention relates to animal brushes and more particularly to a brush adapted for use in applying liquid medication onto the skin of an animal.

Frequently animals such as dogs and cats have need for a liquid medication to be applied on their skin. Because of the animal's hairy coat, it is a difficult and laborious task to repeatedly spread the hair, exposing each time a small portion of the skin in the affected area on which to apply the medication. If the animal has long hair and its skin is very sensitive, applying the medication in this manner is almost an impossible task.

In accordance with the present invention, a brush is provided having a hollow body containing a liquid medication. Detachably mounted to the bottom of the body is a hollow head having a plurality of depending elongated hollow teeth communicating with the interior thereof. Enclosed in the hollow body is a reciprocating pump provided with an inlet check valve and an outlet check valve, the latter in a passageway leading to the hollow head. The pump is manually operated by a lever pivotally connected on the side of the brush handle. With the brush head positioned with its elongated hollow teeth extending through the hair of the animal so that the tips thereof contact the skin, the liquid medication contained in the hollow body can be manually pumped in a controlled manner by use of the lever into the hollow head and out the plurality of the hollow teeth onto the skin of the animal.

One of the objects of the present invention is to provide a brush especially adapted for readily applying liquid medication over a large area of the skin of an animal.

Another object of the present invention is to provide a brush having a hollow body containing a liquid medication and enclosing a pump which can be manually operated to force the medication in a controlled manner into a hollow head having a plurality of depending elongated hollow teeth communicating with the interior thereof.

With these and other objects in view the invention consists of the construction, arrangement and combination of the various parts of the device whereby the objects contemplated are attained as hereinafter set forth, pointed out in the appended claims and illustrated in the accompanying drawings.

BRIEF DESCRIPTION OF THE DRAWINGS

FIG. 1 is a perspective view of the animal medication brush of the present invention;

FIG. 2 is a longitudinal vertical sectional view of the brush as taken along line 2—2 of FIG. 1;

FIG. 3 is a longitudinal horizontal partly sectional view of the brush as taken along lines 3—3 of FIG. 2;

FIG. 4 is a transverse vertical sectional view of the brush as taken along line 4—4 of FIG. 2;

FIG. 5 is a partial view of the bottom of the hollow body showing the side clips and end stops for retaining the brush head thereon;

FIG. 6 is a perspective view of a comb attachment adapted to be mounted on the bottom of the hollow body in place of the brush head; and FIG. 7 is a sectional view of the comb attachment as taken along line 7—7 of FIG. 6.

DESCRIPTION OF THE PREFERRED EMBODIMENT

Referring to FIG. 1 of the drawings, the animal medication brush 10 of the present invention is shown to include a substantially rectangular hollow body 12 provided with a handle 13. Mounted on the top of the body 12 is a brush head 14 having a plurality of elongated stiff bristles 15 extending therefrom. Detachably mounted on the bottom of the body 12 is a hollow brush head 16 having a plurality of elongated hollow teeth 18 in communication with the interior thereof. A lever 20 is provided on the side of the handle 13 for operating a reciprocating pump 21 (FIG. 3) located within the hollow body 12 to force liquid medication contained therein into the hollow head 16 and out the hollow teeth 18 in a controlled manner.

FIG. 2 shows a longitudinal vertical sectional view of the medication brush 10. The brush 10 is formed of an upper longitudinal half section 25 including a hollow body portion having a curved upper wall 26; and a lower longitudinal half section 27 including a hollow body portion having a thickened bottom wall 29, the outer surface of which is flat. As shown in FIG. 4, the body portions of the upper and lower longitudinal half sections 25 and 27 have their adjoining peripheral walls permanently sealed together to form a chamber 28. A screw cap 30 engages a threaded inlet 31 provided on the end of the body 12 for enabling the chamber 28 to be filled with the liquid medication.

As shown in FIG. 3, the lower longitudinal half section 27 is formed near its handle 13 with an angularly disposed recess 32 into which a housing 33 for the pump 21 is fitted. The pump housing 33 has an opening in the form of a cylinder 35 in which a piston 36 is mounted to slide. A coil spring 37 within the cylinder 35 loads the piston 36 in its normally outward position. A piston rod 39 has its inner end connected to the piston 36 and its outer end connected by a pin 41 residing in an elongated opening 42 provided on the inner end of an angular arm portion 40 of lever 20. The outer end of the angular arm portion 40 of the lever 20 is pivoted on a pin 44 mounted in a side slot 53 on the body 12.

Provided on the side of cylinder 35 is an inlet port 47 having therein an inlet ball check valve 46 and an outlet port 51 having therein an outlet ball check valve 49. The inlet port 47 provides an opening from the chamber 28 into cylinder 35. As illustrated in FIGS. 3 and 4, the interior surface 34 of the bottom wall 29 of the lower longitudinal half section 27 of the body 12 is slanted toward the inlet port 47 to enable the liquid medication in chamber 28 to enter the cylinder 35. The outlet port 51 provides an opening from cylinder 35 to a passageway 54 which is provided in the bottom wall 29 of the body 12 and leads to the central opening 56 thereof.

With the piston 36 held in its normally outer position by coil spring 37, the inlet ball check valve 46 in inlet port 47 is positioned off its seat 43 by a coil spring 48 and the outlet ball check valve 49 in outlet port 51 is positioned against its seat 45 by a coil spring 52. Such a structure enables the liquid medication in the chamber 28 to freely enter the cylinder 35 on the upward stroke of the piston 36 and causes the liquid medication to be forced through passageway 54 on the downward stroke of the piston 36.

The hollow head 16 detachably mounted on the bottom of the hollow body 12 is a separate unit comprised of a flat substantially rectangularly shaped upper wall member 17 having an upwardly projecting central coupler 59 and a preferably molded outwardly curved bottom wall member 19 having the plurality of elongated hollow teeth 18 integrally depending therefrom. The bottom wall member 19 may be molded of a resilient material to give flexibility to the elongated hollow teeth 18. The bottom wall member 19 has on its inner sides a peripheral groove 22 which engages and is permanently sealed to a peripheral lip or flange 23 depending from the sides of the upper wall member 17 to form the feed chamber 57 of the brush head 16.

As shown in FIG. 4, the depending peripheral flange 23 is located inwardly of the longitudinal side edges of the upper wall member 17. Thus, to attach the brush head 16 to the bottom of the hollow body 12, one longitudinal side edge of its upper wall member 17 is engaged in the three spaced depending clips 62 (FIG. 3) integrally formed on one side of the bottom wall 29 of the lower longitudinal half section 27. The brush head 16 is then swung upwardly, as illustrated in FIG. 4, such that the opposite longitudinal side edge of the upper wall member 17 is snapped into engagement with the three spaced depending clips 62 integrally formed on the opposite sides of the bottom wall 29. At the same time, the peripheral lip 60 on the upwardly projecting central coupler 59 on upper wall member 17 snaps into the peripheral groove 61 on the central opening 56 in the bottom wall 29 to provide a detachable seal fit. When so mounted, the ends of the brush head 16 engage the stops 64 integrally formed on the ends of the bottom wall 29 of the lower longitudinal section 27.

The upper brush head 14 comprises an outwardly curved wall 66 the shape of which conforms with that of the upper wall 26 of the chamber 28 in body 12. The outwardly curved wall 66 has fixedly connected thereto a plurality of relatively stiff plastic bristles 15 provided with end balls 67. The peripheral sides of the outwardly curved wall 66 are provided with inwardly extending lips or flanges 68 that snap into peripheral grooves 69 provided on the sides of the upper wall 26 of the body portion of the upper longitudinal half section 25. The upper brush head 14 is preferably permanently bonded on the top of the body 12.

It should now be evident that when it is desired to apply a liquid medication to the affected area of the skin of an animal, the screw cap 30 on the threaded inlet of body 12 is removed so that the chamber 28 therein can be filled with liquid medication, and the screw cap 30 is then replaced. The brush 10 is then positioned with its hollow teeth 18 extending through the hair of the animal in the affected area of the skin such that the tips thereof contact the skin. Then, by moving the lever 20 with the index finger of the hand used to hold the handle 13, the operator can control the amount of the liquid medication that will be pumped from the chamber 28 into the feed chamber 57 of the brush head 16 and out the hollow teeth 18 onto the skin of the animal. It should now be appreciated that after the medication liquid has been so applied, the brush 10 can be turned over such that the bristles 15 with the ball tips 67 provided on the brush head 14 can be used to massage the area of the animal's skin to which the medication has been applied.

FIG. 6 shows a comb attachment 70 which may be detachably mounted on the bottom of body 12 in place of the brush head 16. Comb attachment 70 is comprised of an outwardly curved mounting wall member 71 having formed on the interior thereof a central well 74 with a projecting central coupler 75 having a peripheral flange or lip 76. The mounting wall member 71 is provided with longitudinal side edges 77 conforming in shape to those on the top wall member 17 of the brush head 16 to enable it to be attached to the bottom wall 29 of the body 12 by use of the side clips 62 and the end stops 64. When so attached, the peripheral lip 76 on central coupler 75 snaps into the peripheral groove 61 on the inner wall of the central opening 56 in the bottom wall 29 of the body 12 to provide a detachable seal fit. Of the row of elongated teeth 79 on the comb attachment 70, only the center five teeth, designated 79a, are hollow and communicate with the central well 74 which receives the liquid medication supplied by manipulating the pump 21. Thus, while using the comb attachment 70, the liquid medication in the chamber 28 of body 12 can be forced in a controlled manner out through the five hollow teeth 79a by actuating the lever 20 of the pump 21.

While the invention has been concerned with a particular embodiment of the present invention, it is to be understood that many modifications and variations in the construction and arrangement thereof may be provided for without departing from the spirit and scope of the invention or sacrificing any of its advantages. The invention is therefore considered as including all such possible modifications and variations coming within the legitimate and valid scope of the claims.

What is claimed is:

1. An animal medication brush comprising:
    a hollow body having a handle and a bottom with an opening;
    a closeable inlet to said hollow body for filling the interior thereof with a liquid medication;
    a hollow brush head having an upper wall member mounted on the bottom of said body, said brush head having an inlet coupler on the upper wall member thereof fitted in the opening on the bottom of said body;
    a plurality of elongated hollow teeth depending from the hollow brush head in communication with the interior thereof;
    a reciprocating pump disposed within said hollow body, said pump having an inlet valve communicating with the interior of said hollow body and an outlet valve communicating with a passageway leading to the opening in the bottom of said hollow body; and
    a manually operated lever on the side of the handle of said hollow body for operating said pump to force the liquid contained in the hollow body in a controlled manner through said coupler into said hollow brush head and out said elongated hollow teeth.

2. The animal medication brush of claim 1 wherein said body is provided with clip means on the bottom therof for detachably mounting said hollow brush head thereon.

3. The animal medication brush of claim 2 including a comb attachment for detachably mounting to the bottom of said body in place of said hollow brush head, said comb attachment comprising:
    a curved wall member having an inner and outer side;
    a well on the inner side of said wall member having an inlet coupler extending thereabove for fitting in the opening on the bottom of said hollow body; and a single row of depending elongated teeth depending from the outer side of said well member, only a portion of said teeth being hollow and communicating with said well.

4. The animal medication brush of claim 1 including a brush head with bristles mounted on the top of said body.

5. A brush comprising:

a handle provided at one end thereof with an enlarged hollow body depending therefrom, said hollow body having an opening in the bottom thereof;

a hollow brush head having an upper wall member detachably mounted to the bottom of said hollow body, said brush head having an inlet coupler on the upper wall member thereof fitted in the opening on the bottom of said hollow body;

a plurality of elongated hollow teeth depending from the hollow brush head in communication with the interior thereof;

a reciprocating pump disposed within said hollow body, said pump having an inlet valve communicating with the interior of said hollow body and an outlet valve communicating with a passageway leading to the opening in the bottom of said hollow body;

said hollow body provided with a closeable inlet for filling the interior thereof with a treating liquid to be dispensed; and a manually operated lever on the side of the handle of said hollow body for operating said reciprocating pump to force the liquid contained in the interior of the hollow body in a controlled manner into said hollow brush head and out said elongated hollow teeth.

6. An animal medication brush comprising:

a hollow body having a handle and a bottom with an opening;

a hollow brush head having an upper wall member mounted on the bottom of said body, said brush head having an inlet coupler on the upper wall member thereof fitted in the opening on the bottom of said body;

a plurality of elongated hollow teeth depending from the hollow brush head in communication with the interior thereof;

a reciprocating pump within said hollow body including:

a pump cylinder having a spring loaded piston therein and an inlet port and an outlet port;

a spring loaded check valve in the inlet port;

a spring loaded check valve in the outlet port; and a passageway leading from the outlet port to the opening in the bottom of said hollow body;

a closeable inlet to said hollow body for filling it with a liquid medication; and a manually operated lever on the side of the handle of said hollow body for operating said pump to force the liquid contained therein in a controlled manner through said inlet coupler into said hollow brush head and out said elongated hollow teeth.

7. The animal medication brush of claim 6 wherein said pump includes a piston rod; and wherein said lever is manually pivotally connected to said body and to the end of said piston rod for reciprocally moving said piston in said cylinder.

8. An animal medication brush comprising:

a hollow body having a handle and a bottom with an opening;

a hollow brush head having an upper wall member mounted on the bottom of said body, said brush head having an inlet coupler on the upper wall member thereof fitted in the opening on the bottom of said body;

a plurality of elongated hollow teeth depending from the hollow brush head in communication with the interior thereof;

a reciprocating pump within said hollow body including a pump cylinder having a piston slideable therein and an inlet valve and an outlet valve;

a passageway leading from the outlet valve of the pump to the opening in the bottom of said hollow body;

a closeable inlet to said hollow body for storing a liquid medication in the interior thereof; and a manually operated lever on the side of the handle of said hollow body for reciprocally moving said piston within said cylinder to force the liquid contained in the hollow body in a controlled manner through said inlet coupler into said hollow brush and out said elongated hollow teeth.

* * * * *